(No Model.)
C. P. RUSSELL.
DRILLING MACHINE.
No. 537,719. Patented Apr. 16, 1895.
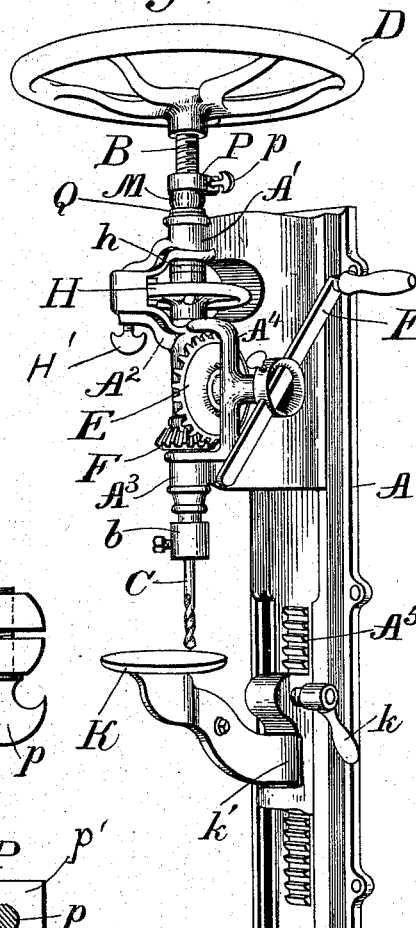
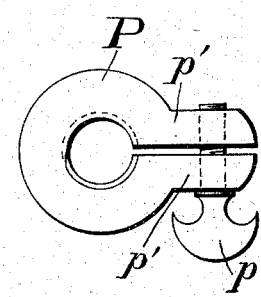
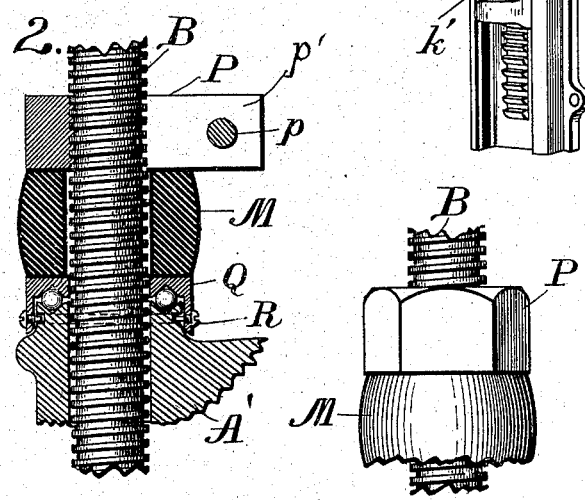
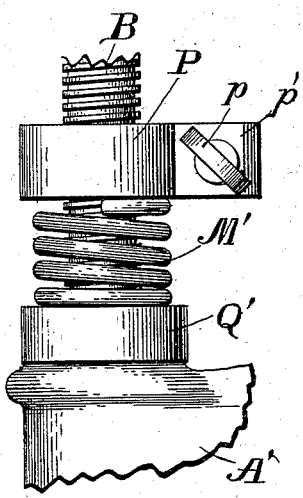
Witnesses
Percy C. Bowen
Maurice Aroussa
Inventor
Charles P. Russell,
by Whitman & Wilkinson
Attorneys

United States Patent Office.

CHARLES P. RUSSELL, OF GREENFIELD, MASSACHUSETTS, ASSIGNOR TO THE WILEY & RUSSELL MANUFACTURING COMPANY, OF SAME PLACE.

DRILLING-MACHINE.

SPECIFICATION forming part of Letters Patent No. 537,719, dated April 16, 1895.

Application filed January 29, 1895. Serial No. 536,542. (No model.)

*To all whom it may concern:*

Be it known that I, CHARLES P. RUSSELL, a citizen of the United States, residing at Greenfield, in the county of Franklin and State of Massachusetts, have invented certain new and useful Improvements in Drilling-Machines; and I do hereby declare the following to be a full, clear, and exact description of the invention, such as will enable others skilled in the art to which it appertains to make and use the same.

My invention relates to improvements in drilling machines, and especially to certain improvements upon the drilling machine described in the patent to Smart and Martin, dated February 12, 1895, and numbered 534,180.

It has been found that in the drilling machine described in the application aforesaid, there is a tendency of the drill to feed forward too rapidly after the plate being drilled has been perforated nearly or quite through causing the said drill to catch or bind in the broken hole and also causing the point to sharply strike the table or support for the said plate and breaking the said drill or the point thereof. This defect has been remedied by the improvement hereinafter described and claimed.

Reference is had to the accompanying drawings, in which the same parts are indicated by the same letters throughout the several views.

Figure 1 represents a perspective view of the improved drilling machine. Fig. 2 represents a detailed sectional view of my specific improvement thereon. Fig. 3 represents a side elevation of a modification of the device shown in Fig. 2. Fig. 4 represents a view on an enlarged scale of the adjustable collar connected to the screwthreaded drill spindle for regulating, or controlling, the downward motion of the same; and Fig. 5 represents a detailed view showing an ordinary nut used instead of the adjustable collar shown in Fig. 4.

A represents the bed plate which is provided with the lugs $A'$, $A^2$ and $A^3$, in which the drill spindle is journaled. The bed plate is also provided with a frame $A^4$ in which the shaft of the driving gear E is journaled, and with a rack $A^5$ for the purpose of adjusting the height of the table K.

The drill spindle B is screwthreaded as shown, and the mechanism for operating the said drill spindle is shown most clearly in the specification of Smart and Martin hereinbefore referred to. The lower end of the drill spindle is provided with a chuck $b$ in which is mounted the drill C; while at the upper end of the drill spindle the fly wheel D is provided. The drill spindle and drill are revolved by means of the gear wheels E and F, the former being turned by means of the adjustable handle $E'$. It will be obvious that the driving shaft may be driven by any suitable gearing, other than by hand, if desired.

The table K has a heel $k'$ which slides up and down between guides on the bed plate A, and is clamped in position by means of the hand lever $k$ which operates a pawl engaging in the rack $A^5$, as is well known in drilling machines of this character.

The feed motion is given to the drill by means of the hand wheel H which has a screwthreaded hub engaging the screw-threads on the drill spindle and bears, when feeding, against the ball bearing $h$ as described fully in the application of Smart and Martin already referred to. This wheel may also be braked mechanically by means of the thumb screw $H'$ and suitable brakes similar to those described in the application referred to.

In order to prevent the drill spindle from feeding down too rapidly when the plate being bored is nearly or quite bored through, a suitable stop such as the set collar P, or the nut $P'$ is adjusted at the desired distance above a suitable buffer which rests on any part of the fixed frame work of the machine. This buffer may be either a disk of rubber such as is shown at M, or a spring $M'$, or a combination of the two, or any other suitable buffer. The distance between the stop and the buffer should preferably be about the thickness of the plate to be bored through. The stop shown in Figs. 1 to 4 is in the form of a set collar P with resilient arms $p'$ clamped together by means of the thumb screw $p$, whereby the said collar is set firmly on the drill spindle. Where a nut is used, as shown in Fig. 5, it is simply screwed up or down to the desired point, and will revolve with the drill spindle until the said drill spindle is fed down as low as desired, when the nut should bring up against the buffer. Beneath the buffer there should be either a plain washer Q' as shown in Fig. 3, or a washer Q adapted to form part of the ball bearing R as shown in Fig. 2. In either case when the nut or collar brings up against the buffer, the rotation of the drill spindle will be transmitted to the buffer and to washer Q or Q', but without screwing up on the set collar P, or more especially, upon the nut P'. It will thus be seen that the rubber disk M, or the spring M' will act as a buffer to arrest the downward feed of the drill, thus preventing the drill from being broken by feeding down too rapidly and striking the table K. This provision of a buffing device to check the feed of counter-sinks is of special importance since the points of these tools are very readily broken.

The position of the buffer on the drill spindle is immaterial, provided the device be so arranged that the pressure is thrown on the buffer when it is taken off from the material being bored. Thus the buffer may be placed near the fly wheel D as shown or near the drill C, or at any other part of the drill spindle preferred, the bed plate or frame A being modified accordingly. Moreover the nut or set collar may be used without the buffer as a gage for the depth of the holes to be drilled.

It will be evident that a buffing device similar to that herein described may be used upon drilling machines of all kinds where there is a tendency to great irregularities in the feed. These, and the various other advantages of the herein described construction, will readily suggest themselves to any one skilled in the art.

Having thus described my invention, what I claim, and desire to secure by Letters Patent of the United States, is—

1. In a drilling machine the combination with a bed plate with journal bearings therein for the drill spindle, of a drill spindle screw-threaded along a portion of its length and free to revolve in said bearings, a hand feed wheel provided with a screwthreaded hub engaging the screw threads on said spindle, the said hub fitting snugly between two of said bearings, a stop mounted on said drill spindle, and a buffer interposed between said stop and part of the frame work of the machine, and adapted to be struck by said stop at a given point of the feed, substantially as described.

2. In a drilling machine the combination with a bed plate with journal bearings therein for the drill spindle, of a drill spindle screw-threaded along a portion of its length and free to revolve in said bearings, a hand feed wheel provided with a screwthreaded hub engaging the screw threads on said spindle, the said hub fitting snugly between two of said bearings, an adjustable stop mounted on said drill spindle, a washer inclosing said drill spindle, and supported by the frame work of the machine, and a buffer interposed between stop and said washer and adapted to be struck by said stop, at the desired point of feed, substantially as described.

3. In a drilling machine the combination with a bed plate with journal bearings therein for the drill spindle, of a drill spindle screw-threaded along a portion of its length and free to revolve in said bearings, a hand feed wheel provided with a screwthreaded hub engaging the screw threads on said spindle, the said hub fitting snugly between two of said bearings, an adjustable stop mounted on said drill spindle, a washer inclosing said drill spindle, a ball bearing interposed between said washer and the frame work of the machine, and a buffer placed between said washer and said stop and adapted to be struck by said stop at the desired point of feed, substantially as described.

4. In a drilling machine, the combination with a bed plate with journal bearings therein for the drill spindle, of a drill spindle screw-threaded along a portion of its length, and free to revolve in said bearings, a feed nut engaging the screwthreads on said spindle, the hub of said nut fitting snugly between two of said bearings, an adjustable stop mounted on said drill spindle, a washer inclosing said drill spindle, and supported by the framework of the machine, and a buffer interposed between said stop and said washer, and adapted to be struck by said stop at the desired point of feed, substantially as described.

In testimony whereof I affix my signature in presence of two witnesses.

CHARLES P. RUSSELL.

Witnesses:
FRANCIS N. THOMPSON,
LOTTIE E. STRATTON.